UNITED STATES PATENT OFFICE.

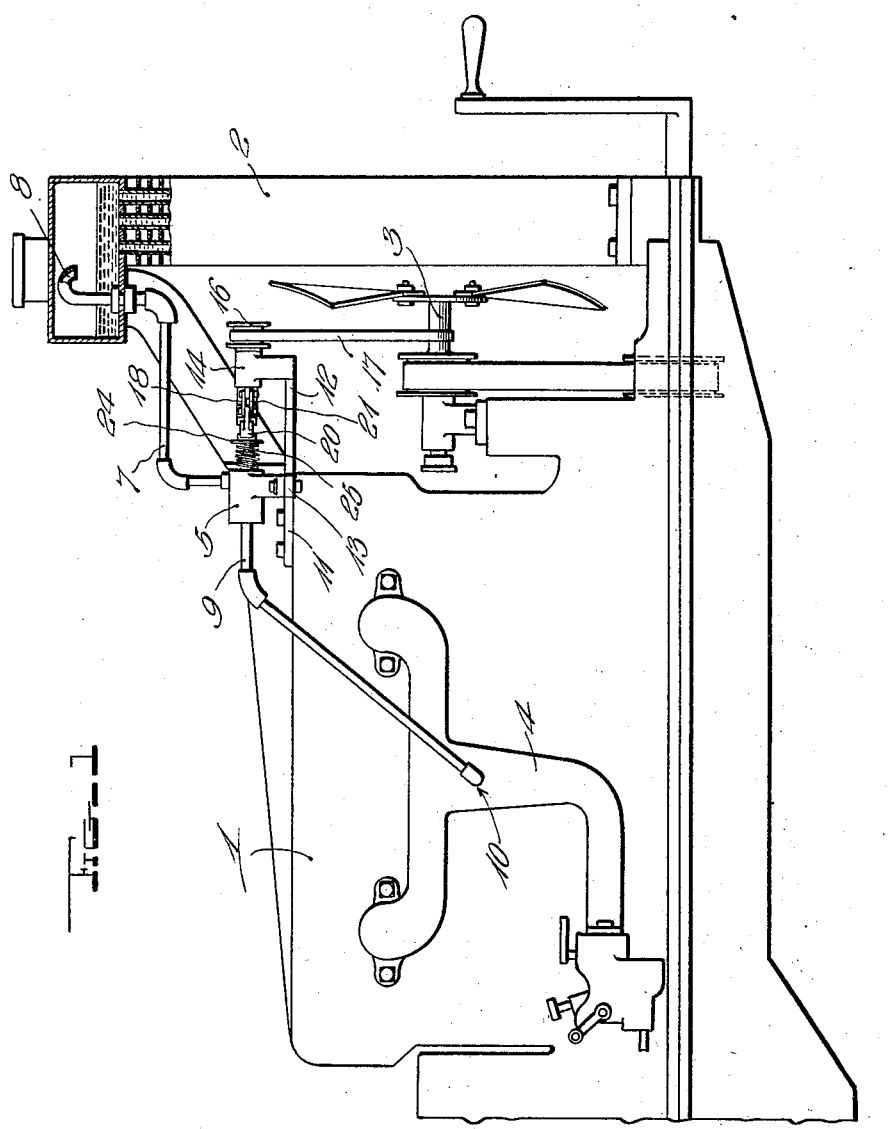

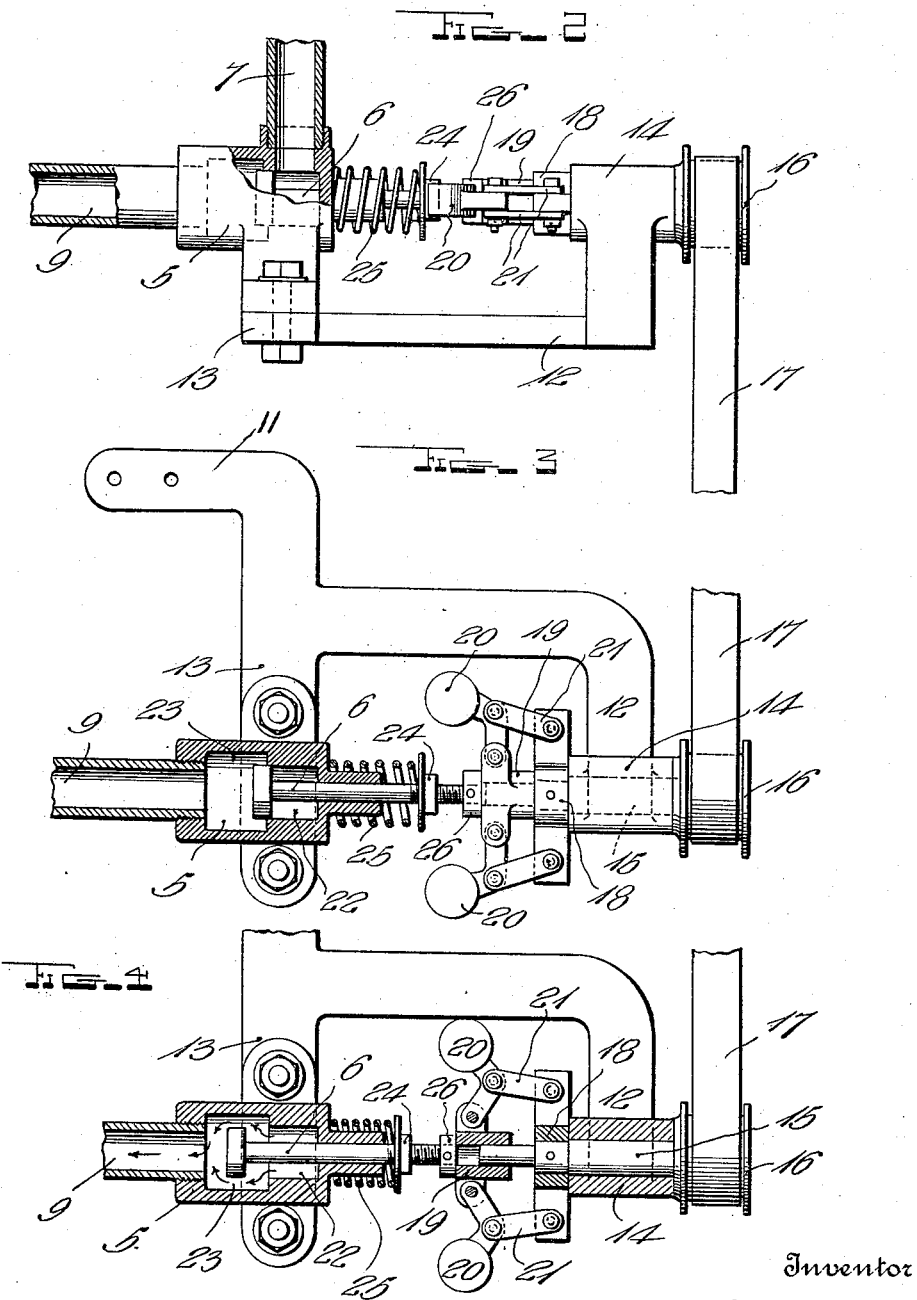

WADE H. GUTHRIE, OF CHARLESTON, WEST VIRGINIA.

AUTOMATIC AIR-CONTROLLING DEVICE FOR GAS-ENGINES.

1,279,685. Specification of Letters Patent. Patented Sept. 24, 1918.

Application filed January 8, 1917. Serial No. 141,215.

*To all whom it may concern:*

Be it known that I, WADE H. GUTHRIE, a citizen of the United States, residing at Charleston, in the county of Kanawha and State of West Virginia, have invented certain new and useful Improvements in Automatic Air-Controlling Devices for Gas-Engines; and I do declare the following to be a full, clear, and exact description of the invention, such as will enable others skilled in the art to which it appertains to make and use the same.

This invention relates to new and useful improvements in automatic air controlling devices for gasolene or explosive engines, and more particularly to one in which the speed of the engine is automatically controlled by the opening and closing of a valve arranged to admit air or steam from the top of an automobile radiator or other point to the intake manifold, thereby increasing the power and reducing the expense of operating a motor.

The object of the present invention is to provide a device of this character which is simple and inexpensive in construction and which may be quickly and easily applied to automobile or other engines.

A further object of my invention is to provide a compact device which can be attached to the top of the engine body, and when so attached disposes the device over the fan shaft.

With these and numerous other objects in view, the invention consists of the novel features of construction, combination and arrangement of parts which will be hereinafter referred to and more particularly pointed out in the specification and claims.

In the accompanying drawings:

Figure 1 is a side elevation, partly in section of a portion of an automobile engine, showing the invention applied thereto;

Fig. 2 is a detail side elevation of the driven shaft and valve construction, showing the valve partly in section;

Fig. 3 is a top plan view of the construction shown in Fig. 2 with the valve in section, and in normal closed position;

Fig. 4 is a view similar to Fig. 3, showing the valve in operation.

In the accompanying drawings 1 denotes the automobile engine, 2 the radiator and 3 the usual cooling fan shaft which is driven by a belt or other means from the engine shaft, and 4 denotes the intake manifold of the engine.

In applying my invention to an automobile engine, I provide a suitable valve inclosed in a casing 5 provided with a slidable operating stem 6 which passes through one side of the casing. The valve casing 5 has connected to its inlet end a pipe 7 which in Fig. 1 is shown as extending into the upper portion of the automobile radiator 2 and having a downturned open end 8 to receive steam from the radiator. It will be understood, however, that said pipe may lead to another source of steam supply or take in air heated or otherwise. The outlet end of the valve casing 5 is connected by a pipe 9 that is tapped into the intake manifold at 10 or any other suitable point.

In order to automatically operate the valve stem 6 according to the speed of the engine, I provide a centrifugal governing device which coöperates with the valve to open and close the same as will be hereinafter more clearly described. Secured to the engine body is a substantially U-shaped bracket 11 which is provided with two spaced arms 12 and 13, a right angular attaching member 11' is formed integral with the U-shaped bracket and projects beyond the cross piece of the same. This attaching member is disposed in the same plane as the rest of the U-shaped bracket, and when it is attached at its free end to the top of the engine body it disposes the device over the fan shaft of the engine. On the outer end of the spaced arm 12 is formed a bearing 14 in which is journaled a shaft 15 which is disposed substantially parallel with the fan shaft 3. This shaft 15 is provided with a pulley 16 on one end so arranged that it is disposed directly above the exposed portion of the fan shaft 3 and these two parts are connected by a belt 17 whereby when the fan shaft is driven the shaft 15 will move simultaneously therewith.

Secured to the end of the shaft 15 on the opposite side of the bearing 14 from the pulley, is a centrifugal governor which comprises a collar 18 fixed to the shaft, a movable collar 19 on said shaft, governor arms pivotally connected with the movable collar 19 and provided with weights 20 at their outer ends, said arms being connected with projecting portions on the fixed collar by means of links 21, whereby when the governor is operated and the weights swing outwardly, the arms will fulcrum on the links and the movable collar 19 will be moved longitudinally with respect to the shaft.

The valve casing 5 is secured to the spaced arm 13 of the bracket 11 as clearly shown in Figs. 1 and 3 of the drawings and this valve casing is provided with a pair of communicating chambers, the smaller chamber 22 being connected with the inlet pipe, and the larger chamber 23 being connected with the outlet. The inlet and outlet pipes are connected with the casing at right angles to each other and the valve proper when in normal position closes the opening between the two chambers. The valve is provided with a sliding stem 6 which projects through one side of the casing and is disposed in longitudinal alinement with the shaft 15 journaled in the opposite spaced arm 12.

The valve stem 6 is provided with a stop 24 adjacent its outer end which comprises a washer plate held in position by a nut engaging the outer end of the stem and positioned around the stem between the stop 24 and the casing is a coiled spring 25 which is so arranged as to exert a constant outward tension on the stem and hold the valve within the smaller chamber in the casing and hence in closed position. The outer end of the stem 6 has positioned thereon a head 26 which is disposed in engagement with the movable collar 19 which forms part of the centrifugal governor.

In operation, when the speed of the engine reaches a predetermined point, the weights 20 will fly outwardly and the movable collar 19 will be moved forwardly, pressing the valve stem against the tension of the coiled spring 25 and moving the valve into the larger outlet chamber 23 in the casing, thereby opening communication between said chambers and hence holding the valve in open position.

Owing to the fact that the valve stem is pressed against the movable collar by the tension of the coiled spring 25, the centrifugal force necessary to operate the device can be regulated by adjusting the stop 24 on the stem, thereby regulating the tension of the spring. By this adjustment the speed at which the governor must revolve to actuate the valve can be controlled. As the speed of the engine decreases the weights 20 will return to their normal positions and the movable collar will move rearwardly. The coiled spring will force the stem to follow the collar, and the valve will once more return to normal closed position. It will thus be seen that the device is entirely automatic in operation and while I have shown it in the drawings as controlling the flow of steam from the radiator to the intake manifold, it will be understood that it may be used for supplying steam or air from any source. This automatic controlling device may be applied to any type of automobile engine, as it utilizes the small space on the fan shaft, that is the only exposed movable part of the modern automobile engine, to operate it. By so connecting the device with the engine it does not require any change in the castings or other parts of the engine to place the device in operative position.

Various changes in the form, proportion and minor details of construction may be resorted to without departing from the principle or sacrificing any advantages of the invention.

I claim:

1. An attachment for an automobile engine comprising a flat U-shaped bracket having a right angular projection formed at the end of one of its arms provided with a tubular bearing, a right angular attaching member formed integral with the other arm of the U-shaped bracket and projecting beyond the cross piece of the same, said attaching member being disposed in the same plane as the U-shaped bracket, the free end of said attaching member adapted to be attached to the top of the engine body thereby disposing the device above the fan shaft of the engine, a valve casing arranged on the last mentioned arm of the U-shaped bracket provided with an inlet in its side and an outlet at one end, a valve in said casing having a stem projecting through the opposite end of the same in axial alinement with said tubular bearing, a shaft in said tubular bearing provided with a pulley at one end adapted to be driven from the fan shaft of the engine, and a centrifugal governor adapted to coact with said valve stem to control said valve.

2. An attachment for an automobile engine comprising a flat U-shaped bracket having a right angular projection formed at the end of one of its arms provided with a tubular bearing, a right angular attaching member formed integral with the other arm of the U-shaped bracket and projecting beyond the cross piece of the same, said attaching member being disposed in the same plane as the U-shaped bracket, the free end of said attaching member adapted to be attached to the top of the engine body thereby disposing the device above the fan shaft of the engine, a valve casing arranged on the last mentioned arm of the U-shaped bracket provided with an inlet in its side and an outlet at one end, a valve in said casing having a stem projecting through the opposite end of the same in axial alinement with said tubular bearing, a stop on said stem, a shaft in said tubular bearing provided with a pulley at one end adapted to be driven from the fan shaft of the engine, a centrifugal governor on the other end of said shaft disposed between the arms of said bracket, said governor including a sleeve slidable on said shaft and adapted to coact with the end of said valve stem, a spring disposed between the valve casing and said stop on the valve stem, said stop being adjustable whereby to permit the tension on the spring to be varied thereby allowing the valve to be actuated at different speeds of the governor.

In testimony whereof I have hereunto set my hand in the presence of two subscribing witnesses.

WADE H. GUTHRIE.

Witnesses:
D. EDMOND GUTHRIE,
G. NEBBERGALL.

Copies of this patent may be obtained for five cents each, by addressing the "Commissioner of Patents, Washington, D. C."